United States Patent
Sayem et al.

(10) Patent No.: US 11,165,469 B2
(45) Date of Patent: Nov. 2, 2021

(54) RF-ANTENNA ARCHITECTURE IN MOBILE COMMUNICATION DEVICES

(71) Applicant: Motorola Mobility LLC, Chicago, IL (US)

(72) Inventors: Abu T Sayem, Gurnee, IL (US); Mohammed Abdul-Gaffoor, Palatine, IL (US); Minh H Duong, Lake Bluff, IL (US); Ugur Olgun, Chicago, IL (US); Robert E Slater, Lake in the Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 1270 days.

(21) Appl. No.: 14/751,227

(22) Filed: Jun. 26, 2015

(65) Prior Publication Data
US 2016/0381618 A1    Dec. 29, 2016

(51) Int. Cl.
*H04B 7/0413* (2017.01)
*H04B 7/06* (2006.01)
*H01Q 1/24* (2006.01)
*H01Q 21/30* (2006.01)

(52) U.S. Cl.
CPC .......... *H04B 7/0413* (2013.01); *H01Q 1/243* (2013.01); *H01Q 21/30* (2013.01); *H04B 7/0608* (2013.01)

(58) Field of Classification Search
CPC ... H04W 40/06; H04B 7/0413; H04B 7/0608; H04Q 1/243; H04Q 21/30
USPC .................................... 370/328, 329
See application file for complete search history.

(56) References Cited

U.S. PATENT DOCUMENTS

| | | | | |
|---|---|---|---|---|
| 2006/0222092 A1* | 10/2006 | Guo | ...................... | H04B 7/0811 375/260 |
| 2013/0065533 A1* | 3/2013 | Cai | ........................ | H04B 1/109 455/63.3 |
| 2014/0349584 A1* | 11/2014 | Clevorn | ............... | H04B 7/0689 455/67.13 |

* cited by examiner

*Primary Examiner* — Ronald B Abelson

(57) ABSTRACT

Systems and methods for providing high-throughput and reliable operation in WiFi and cellular environments stem in antenna volume-constrained devices employs a switched or multiplexed cellular band antenna to support WiFi MIMO for mobile handheld operation. The device housing may a single, unitary metallic piece having the device antennas formed as part of the housing. Alternatively, one or more antennas may be internal to the device.

13 Claims, 14 Drawing Sheets

RF-ANTENNA ARCHITECTURE IN MOBILE COMMUNICATION DEVICES

TECHNICAL FIELD

The present disclosure is related generally to wireless communication facilities in mobile communication devices, and, more particularly, to a system and method for improving data throughput in antenna volume-constrained mobile communication devices.

BACKGROUND

Modern cellular phones provide numerous ways to connect wirelessly with other devices and networks. For example, cell phone users rely on their devices to be able to connect via a cellular network and also, when available, to one or more short range networks, such as WiFi networks. However, the general reduction in cellular device size has reduced the number of usable antenna regions on a typical device housing.

The distinct frequency bands of different wireless technologies and the limited number of antennas mean that each antenna on a device may be largely dedicated to a single type of connectivity. For example, modern cellular phones have certain antennas for cellular service and others for WiFi service. While it may be possible to have a single antenna serve different wireless channels via multiplexing or reassignment, the inventors are aware of no implementation that has efficiently and seamlessly solved the problems resulting from using limited antenna volume to support multiple channels across diverse wireless environments.

Before proceeding, it should be appreciated that the present disclosure is directed to a system that can eliminate some of the shortcomings noted in this Background section. However, any such benefit is not a limitation on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize any item prior art references or practices. As such, the inventors expressly disclaim this section as admitted or assumed prior art. Moreover, the identification herein of desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
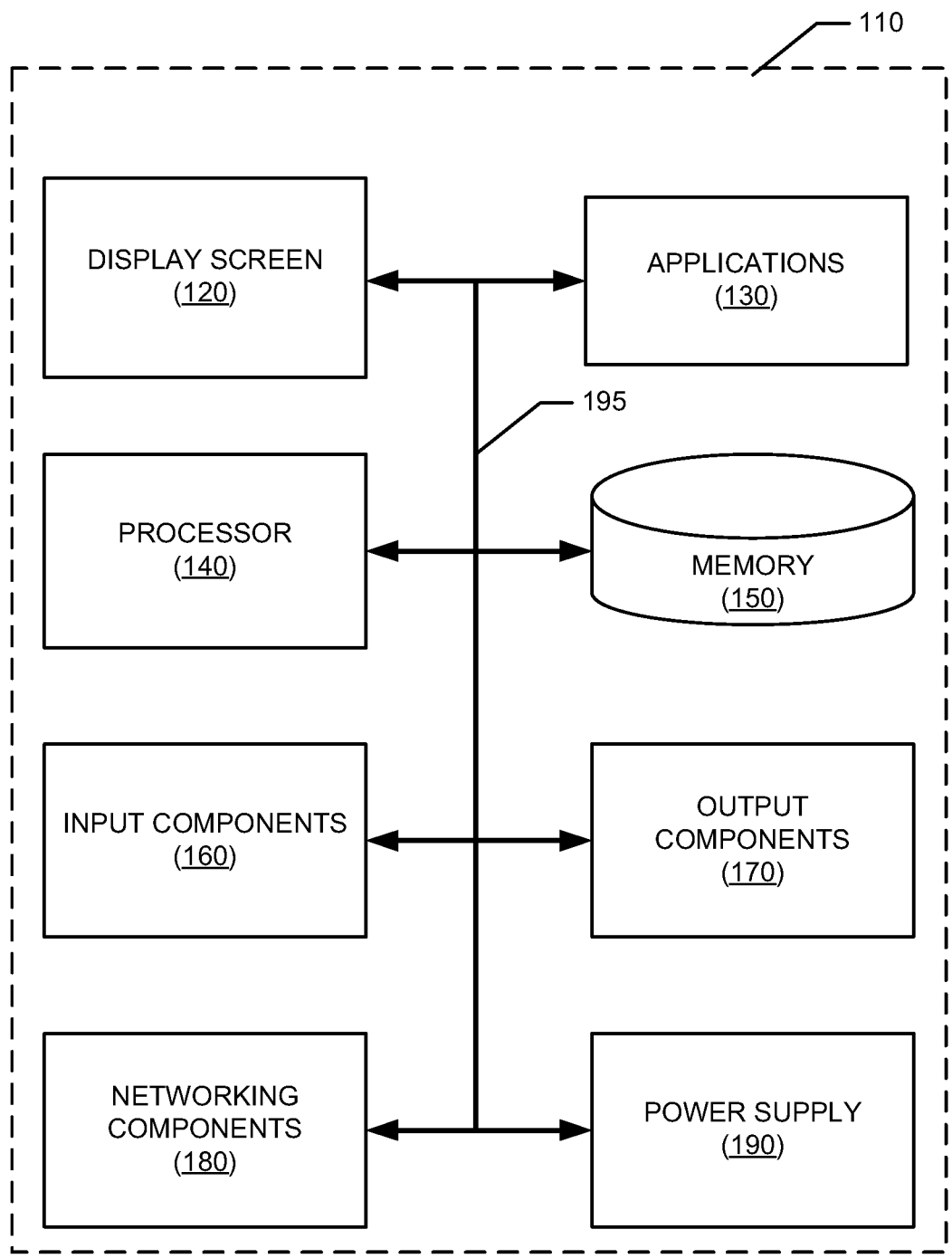
FIG. 1 is a simplified schematic of an example device with respect to which embodiments of the presently disclosed principles may be implemented.

Before presenting a detailed discussion of embodiments of the disclosed principles, an overview of certain embodiments is given to aid the reader in understanding the later discussion. As noted above, the distinct frequency bands of different wireless technologies and the limited number of antennas on devices mean that each antenna on a device may be largely dedicated to a single type of connectivity. This makes it difficult to efficiently use available resources to support multiple channels across diverse wireless environments.

Traditionally, two WiFi antennas (Ant-1 and Ant-2) connected to a WiFi transceiver might be operated in WiFi frequency bands to achieve WiFi MIMO (multiple-input, multiple-output) operation. However, this solution requires two dedicated WiFi antennas, needing more antenna volume. In an embodiment of the disclosed principles, a system is provided that allows high-throughput and reliable operation in both WiFi and cellular environments in an antenna volume-constrained device having a unibody metal housing.

In a further embodiment, a cellular band antenna is used to support WiFi MIMO for a mobile handheld device. In one embodiment, the device housing is a single, unitary piece of metal unlike traditional housings which contain numerous separate pieces separated by electrically insulating material such as plastic.

In this embodiment, one of the available antennas is configured to support the cellular high band for primary transmit/receive as well as the WiFi 5.0 GHz band. In particular, this antenna operates at 2300-2400 MHz (LTE B40) and 2500-2690 MHz (LTE B41) for cellular bands and can be switched to a WiFi transceiver to support 2.4 GHz and 5.0 GHz WiFi MIMO. Although this embodiment supports sharing of a bottom antenna as just mentioned, a top antenna is shared similarly in an alternative embodiment.

In a further embodiment, the MIMO transceiver utilizes two antennas at a time, but one input to the MIMO transceiver is switched between top and bottom antennas depending on the device environment. In particular, if the user's hand is sensed at the bottom of the device, this input of the MIMO transceiver is switched to use the alternative top antenna. Similarly, if the user's hand is sensed at the top of the device, this input of the MIMO transceiver is switched to use the alternative bottom antenna. Sensing of the user's hand may be executed via a direct sensor such as a capacitive sensor, via detection of a degradation in performance, or via both methods.

With this overview in mind, and turning now to a more detailed discussion in conjunction with the attached figures, the techniques of the present disclosure are illustrated as being implemented in a suitable computing environment. The following generalized device description is based on embodiments and examples within which the disclosed principles may be implemented, and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to laptop computers, tablet computers, embedded automobile computing systems and so on.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point, and other considerations.

In the illustrated embodiment, the components of the user device 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

Although not shown in detail in FIG. 1, the device 110 includes software and hardware networking components 180 to allow communications to and from the device. Such networking components provide wireless networking functionality, although wired networking may additionally or alternatively be supported. In an embodiment, as noted above, the networking components 180 include a GPS antenna system to improve device location consistency.

In an embodiment, a power supply 190, such as a battery or fuel cell, may be included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user interface objects (e.g., toggling through various display icons that are linked to executable applications).

Figure 2:
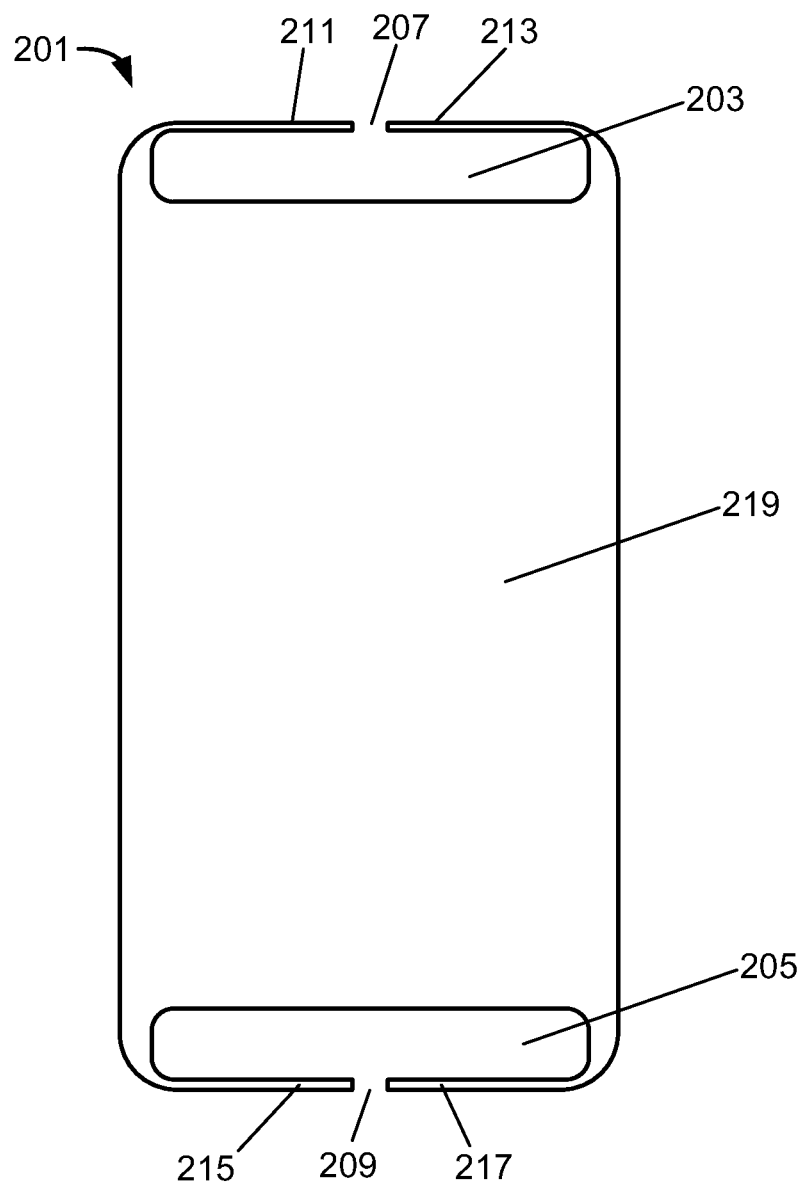
FIG. 2 is a plan view of a one-piece metal back plate in accordance with an embodiment of the described principles.

Turning to FIG. 2, this figure shows a unibody metal back plate 201 for a portable communication device such as device 110 of FIG. 1. It will be appreciated by those of skill in the art that the illustrated housing is simply an example, and that the disclosed principles do not require a unibody housing in every embodiment nor do they require a metallic housing in every embodiment. That said, in the illustrated example, the metal back plate 201 is formed having a first opening 203 and a second opening 205, with the first opening 203 being located in the upper portion of the metal back plate 201 and the second opening 205 being located in the lower portion of the metal back plate 201.

In addition, a first break 207 is located in the top of the metal back plate 201, causing the first opening 203 to be non-closed. Similarly, a second break 209 located in the bottom of the metal back plate 201 causes the second opening 205 to be non-closed. The result of the first opening 203, second opening 205, first break 207 and second break 209 is to cause a number of antenna arms to be formed at the top and the bottom of the metal back plate 201.

In particular, a pair of antenna arms 211, 213 is formed at the top of the metal back plate 201 and another pair of antenna arms 215, 217 is formed at the bottom of the metal back plate 201. The remainder of the metal back plate 201 may be referred to herein for clarity when required as the main body 219 of the metal back plate 201. The antennas 211, 213 and 217 may be referred to herein as antenna 1 (ant-1), antenna 2 (ant-2) and antenna 3 (ant-3).

In a typical WiFi MIMO architecture, top antennas such as the ant-1 and ant-2 antennas (211, 213) in the illustrated example might be used to achieve WiFi MIMO, while a bottom antenna such as ant-3 (217) is dedicated to support cellular communications. However, in an embodiment of the disclosed principles, the bottom antenna ant-3 (217) is used to support WiFi MIMO. In particular, with respect to the example of FIG. 2, one of ant-3's unused frequency responses is used to support WiFi MIMO. In this way, ant-2's (213's) antenna volume is free to provide antenna support for other bands or protocols.

Figure 3:
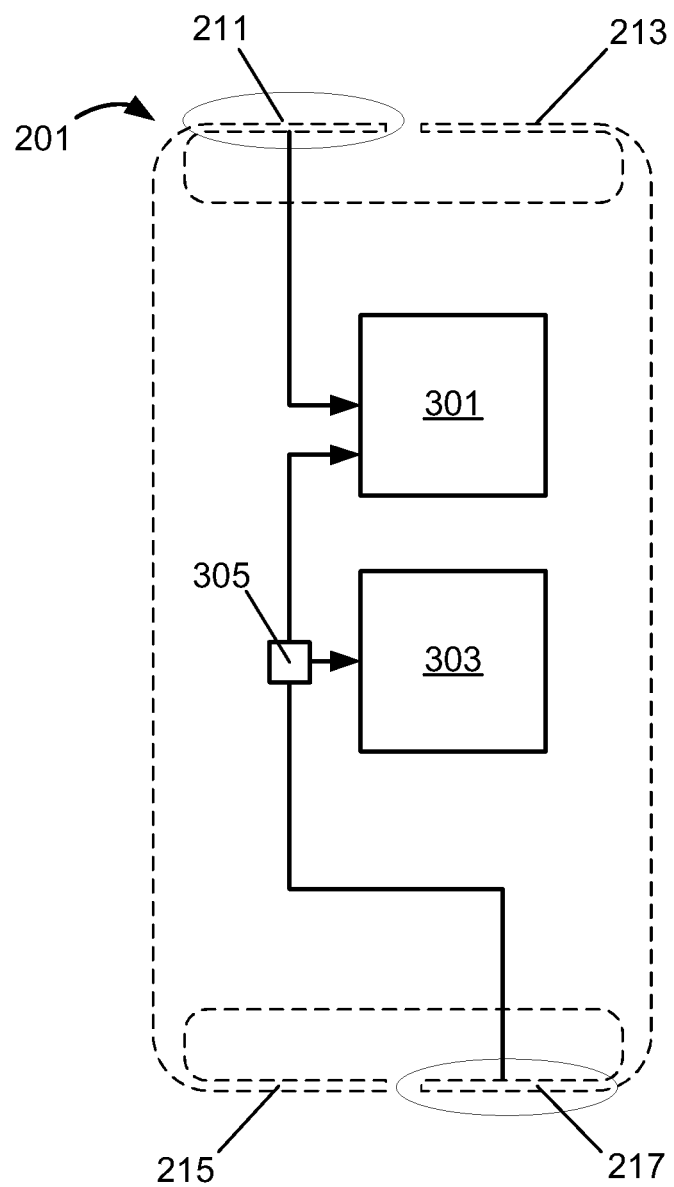
FIG. 3 is a modular view illustrating WiFi MIMO support in accordance with an embodiment of the described principles.

This architecture is shown schematically in FIG. 3. As can be seen, the device's WiFi transceiver 301 is linked to ant-1 (211) and also to ant-3 (217). The device's cellular transceiver 303 is also linked to ant-3 (217), but at a different frequency than that in use by the WiFi transceiver 301.

Figure 4:
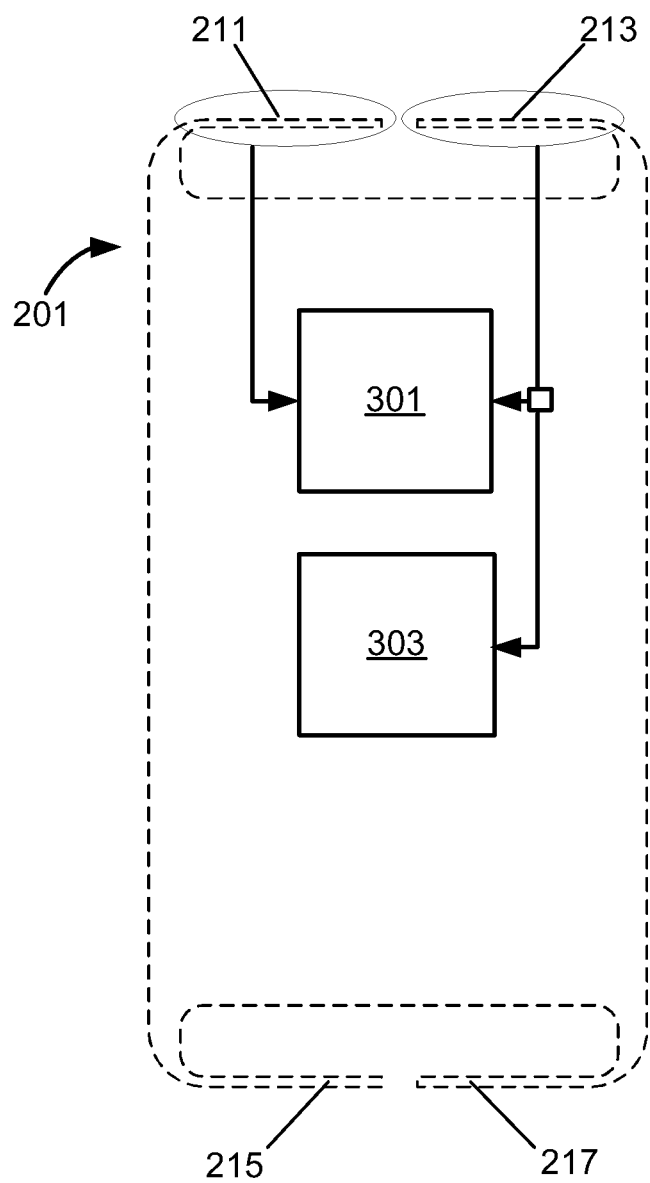
FIG. 4 is a modular view illustrating WiFi MIMO support in accordance with another embodiment of the described principles.

In a further example embodiment for achieving WiFi MIMO, illustrated in FIG. 4, a top antenna such as ant-2 (213) is used in diversity mode to support both WiFi and cellular communications; in particular, in this mode, ant-2's (213's) unused frequency response is employed for WiFi MIMO.

In yet another example embodiment for achieving WiFi MIMO, illustrated in FIG. 4, a top antenna such as ant-2 (213) is used to support both WiFi and cellular diversity/MIMO communications; in particular, in this mode, ant-2's (213's) unused frequency response from cellular diversity/MIMO may be employed for WiFi MIMO. This may be needed when a user's hand impinges a bottom antenna used for WiFi MIMO, which may be detected, for example, via one or both of a capacitive sensor and an RSSI comparator or by other means.

In this embodiment, a single pole double throw switch 401 is located to switch the non-permanent output of the WiFi transceiver 301 between one antenna such as ant-3 (217) and another such as ant-2 (213). Antenna switch modules 403, 405 work in combination with the single pole double throw switch 401 such that the cellular transceiver 303 can then be connected to either of the antennas 213, 217.

Figure 5:
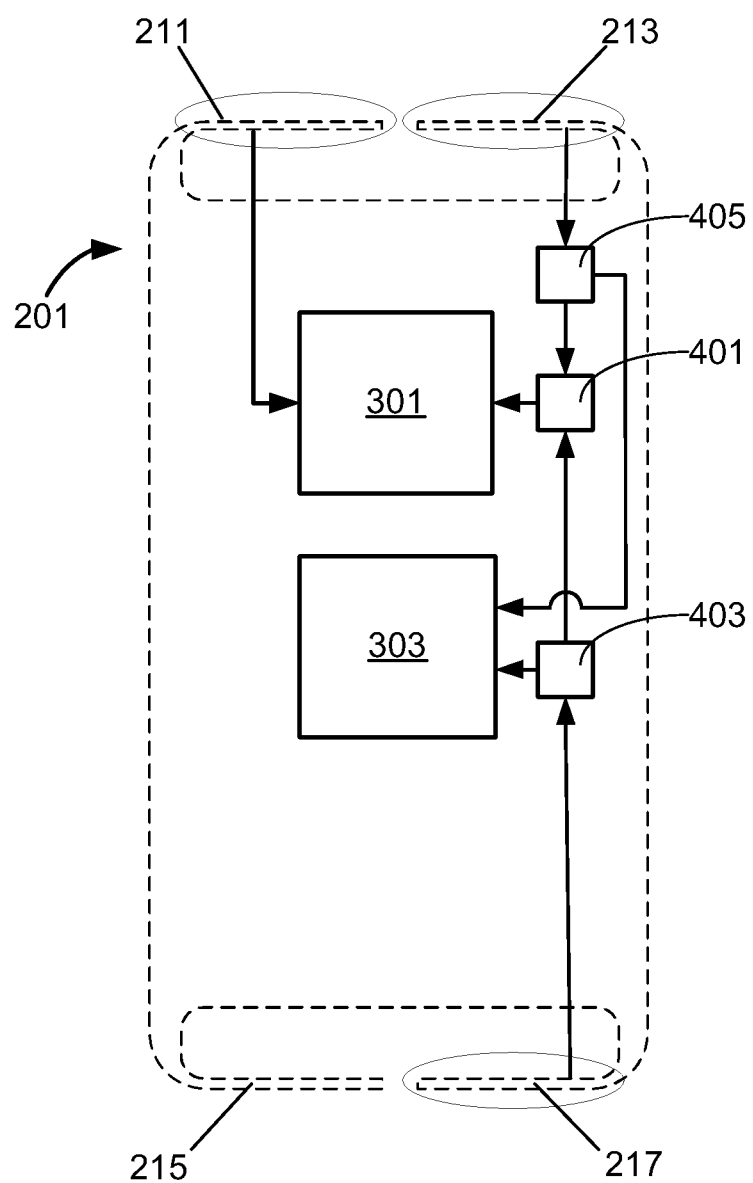
FIG. 5 is a modular view illustrating WiFi MIMO support in accordance with yet another embodiment of the described principles.

FIG. 5 shows a modular schematic for implementing the architectures shown in FIGS. 3-5. Although those of skill in the art will appreciate that other circuit constructions may be used to implement the disclosed principles, FIG. 6 provides an example to clarify operation of the system for those of more casual acquaintance with the art.

In the illustrated implementation, the WiFi transceiver 301 is linked, as shown in FIGS. 3-5, to a dedicated WiFi antenna 501 and to a shared antenna 503. The dedicated antenna 501 and shared antenna 503 may be, for example, ant-1 (211) and ant-3 (217) respectively or ant-1 (211) and ant-2 (213) respectively.

The shared antenna 503 is linked to the WiFi transceiver 301 and also to the cellular receiver 303 through a high band antenna switch module 505. In this way, incoming high band cellular signals such as those in the 2300-2400 MHz band and the 2500-2690 MHz band are switched to the cellular transceiver 303. Similarly, incoming 2400 MHz (2.4 GHz) WiFi signals are switched to the WiFi transceiver 301. These bands are similar enough to be supported by the same physical antenna structure while also being distinct enough to separate at the switch module 505. The switch 505 also operates to allow both outgoing 2.4 GHz WiFi signals and outgoing high band cellular signals to share a single antenna.

Figure 6:
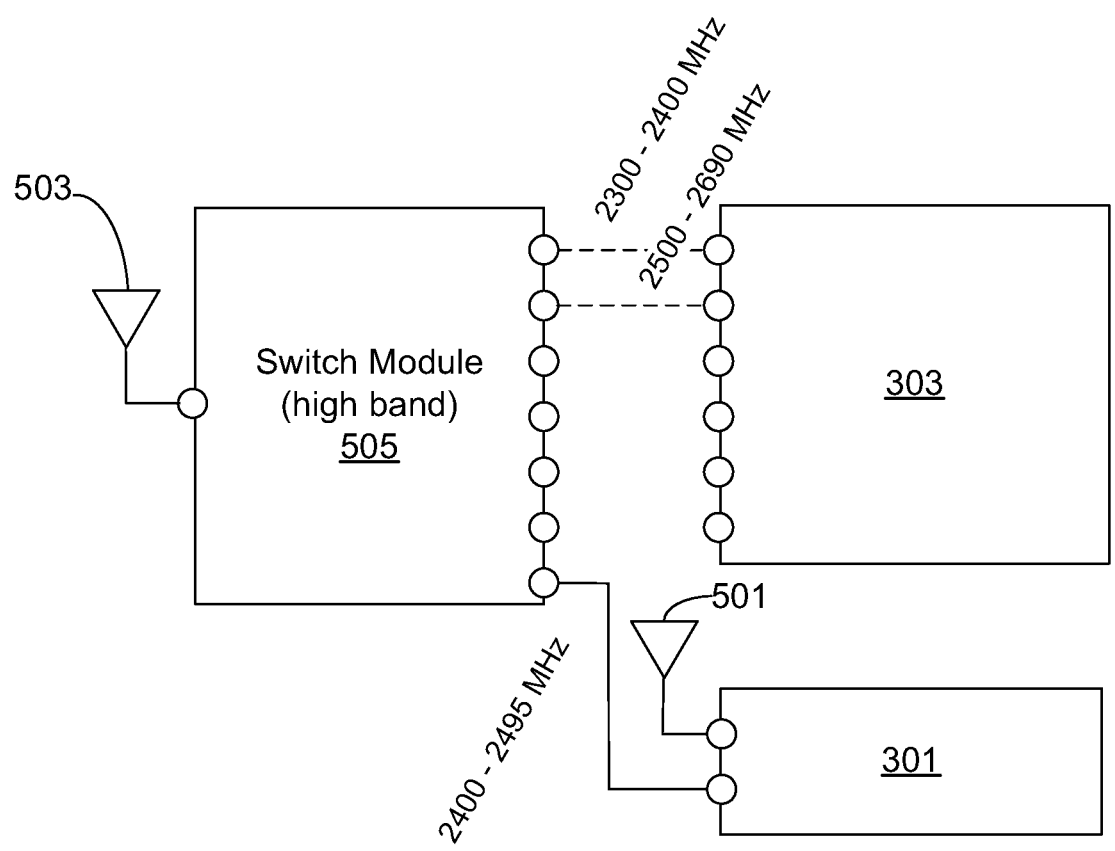
FIG. 6 is a circuit level schematic showing a switched antenna circuit in accordance with an embodiment of the described principles.
Figure 7:
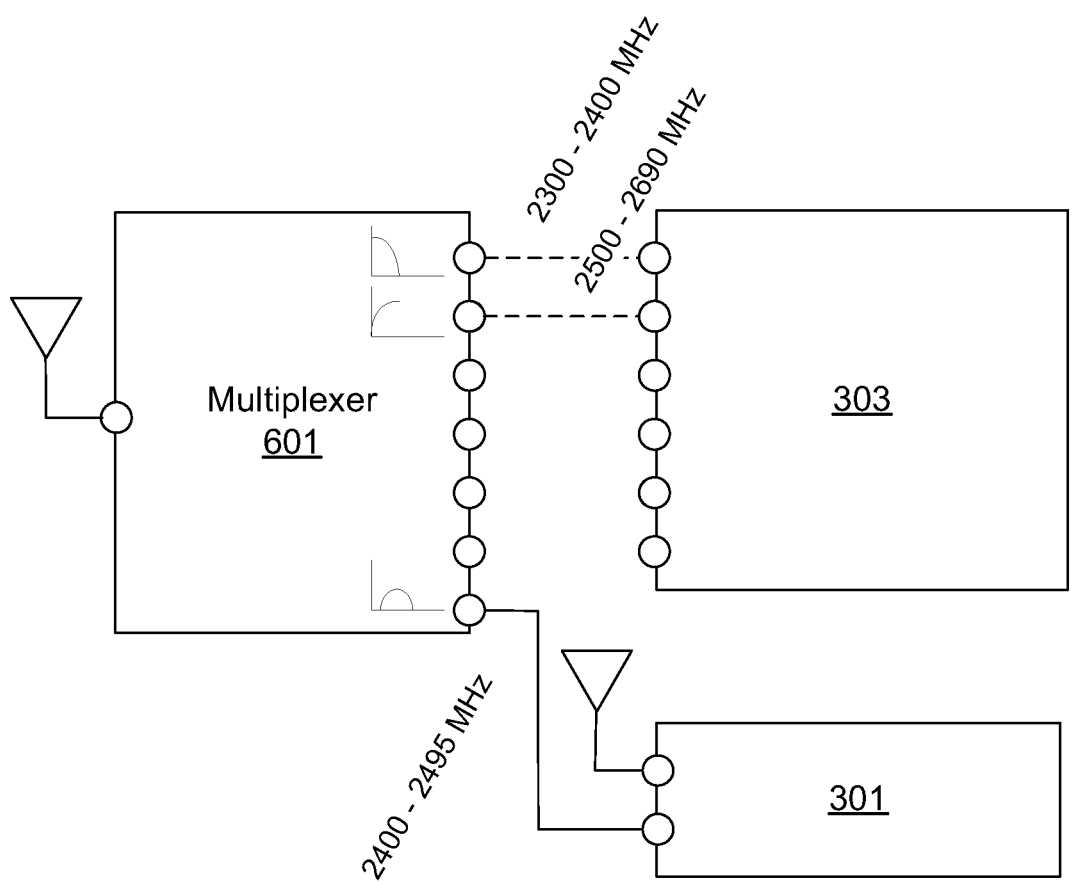
FIG. 7 is a circuit level schematic showing a multiplexed antenna circuit in accordance with an embodiment of the described principles.

Alternatively, rather than switching inputs as performed in the circuit of FIG. 6, the cellular transceiver 303 and WiFi transceiver 301 may be multiplexed to and from the shared antenna 503. In the embodiment shown in FIG. 7, a multiplexer 601 is used to combine the two cellular high bands (2300-2400 MHz and 2500-2690 MHz) associated with the cellular transceiver 303 and the 2.4 GHz WiFi band associated with the WiFi transceiver 301. As can be seen, the WiFi transceiver 301 is also linked to the dedicated WiFi antenna. In another embodiment, other frequency bands and protocols (e.g., GPS and others) may operate on the same shared antenna, and the WiFi frequency response can be multiplexed for supporting WiFi MIMO.

Figure 8:
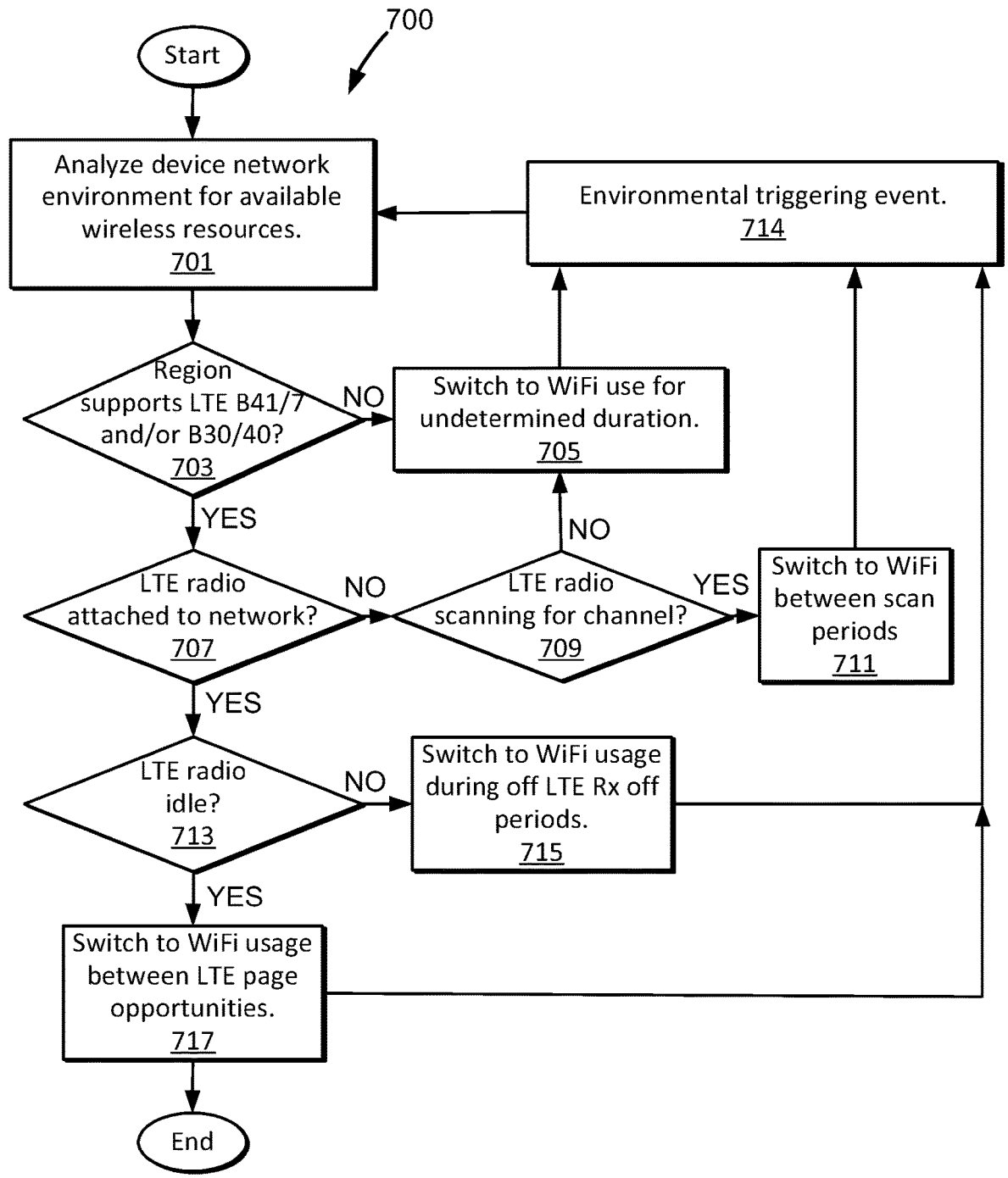
FIG. 8 is a flow chart showing a process of real time switching in accordance with an embodiment of the described principles.

In general, the cellular transceiver 303 will have priority with respect to usage of a shared antenna. There are a number of ways to switch or multiplex the various bands through the shared antenna while maintaining the priority of cellular signals. In an embodiment, antenna usage is determined in real-time based on the need for cellular bandwidth. An example process 700 in keeping with this embodiment is shown in FIG. 8 in the context of LTE (long term evolution) cellular and WiFi.

At stage 701 of the process 700, the processor or antenna controller (both referred to simply as "processor") of the mobile electronic device executes a check of the device's network environment to determine available wireless resources, before transitioning to stage 703. The check of the device's network environment may include one or more of a SIM check, a direct Network Environment check, and a database lookup based on a GPS data.

The processor evaluates the gathered network environment information at stage 703 and determines whether the current region provides support for either or both of LTE B41/7 and B30/40, which employ the 2500-2690 MHz and 2300-2400 MHz bands respectively. If it is found at stage 703 that the current region does not support either LTE B41/7 or B30/40, then the process 700 ends at stage 705 wherein the antenna switches the shared antenna to WiFi usage for an undetermined duration.

If instead it is at stage 703 that the current region does support one or both of LTE B41/7 and B30/40, then the process 700 flows to stage 707, wherein it is determined whether the LTE radio has attached to a network. If it has not, then the processor determines at stage 709 whether the LTE radio is actively scanning for an available channel. If so, the processor switches the shared antenna to WiFi for a predetermined period in between scan periods at stage 711. Otherwise, if the LTE radio is not actively scanning, the process 700 returns to stage 705 and the shared antenna is switched to WiFi usage for an undetermined duration.

If at stage 707 it was determined that the LTE radio has in fact attached to a network, the processor determines at stage 713 whether the LTE radio is idle. If it is not, then the process 700 terminates at stage 715, wherein the shared antenna is switched to WiFi usage during off periods of the LTE transceiver 303. Otherwise, the process 700 flows to the final stage, stage 717, wherein the antenna is switched to WiFi usage between LTE page opportunities. In this way, the shared antenna is used optimally while maintaining LTE usage priority.

Figure 9:
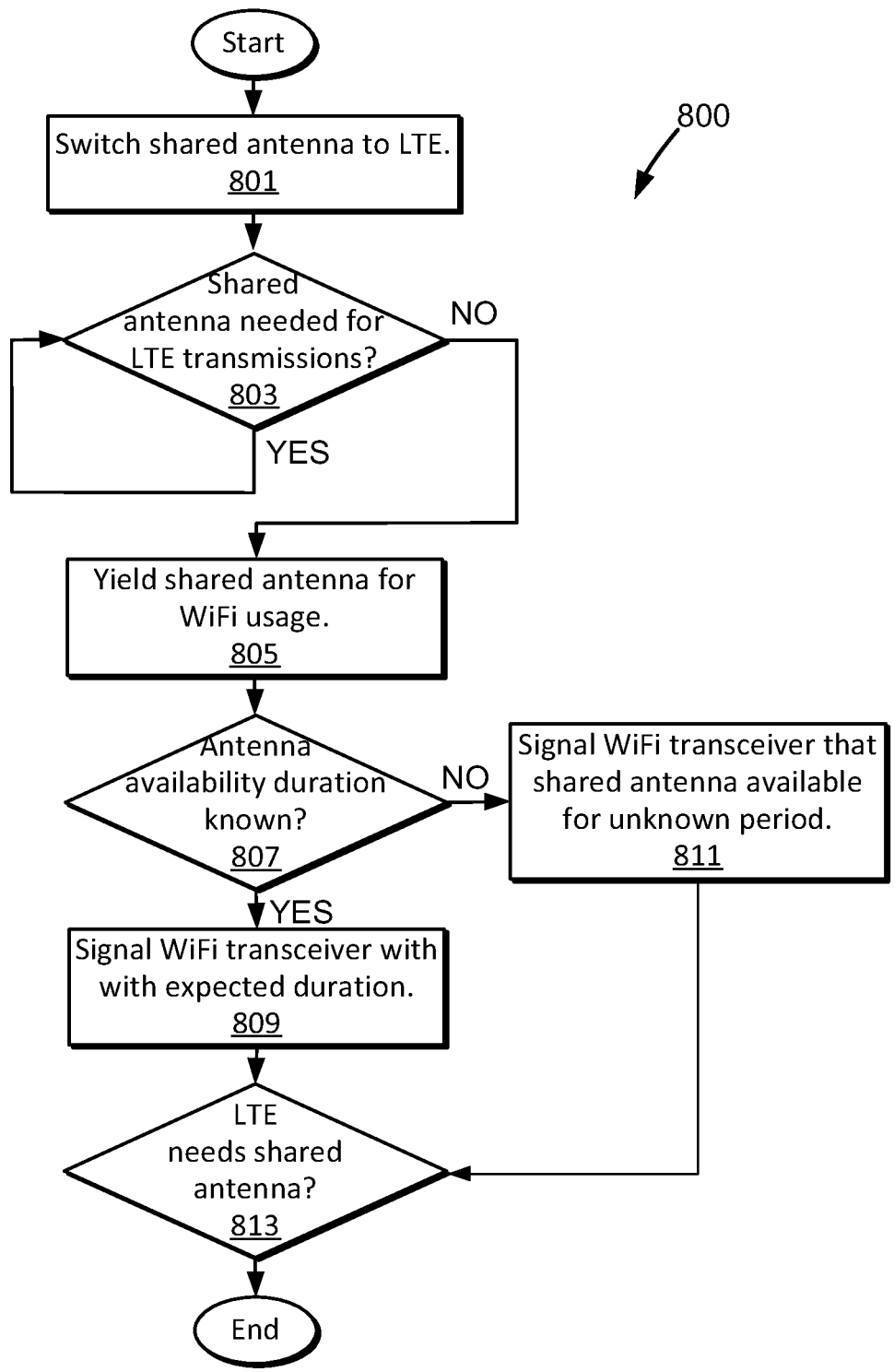
FIG. 9 is a flow chart showing a process of LTE-controlled switching in accordance with an embodiment of the described principles.

Instead of using an indeterminate method such as that illustrated in FIG. 8, it is contemplated that an LTE-driven system may be used. The illustrated process 800 of FIG. 9 is managed by the LTE transceiver 303, and signals the WiFi transceiver 301 when the shared antenna will be available for a defined duration. This allows the WiFi transceiver 301 to more efficiently schedule transmissions to take place within the indicated window of availability.

At stage 801 of the process 800, the shared antenna is switched to LTE usage. Subsequently at stage 803, the LTE transceiver 303 determines whether the shared antenna is needed for LTE transmissions. If the antenna is needed for LTE transmissions, the process 800 loops at stage 803 until the antenna is no longer needed for LTE transmissions.

When the shared antenna is not needed for LTE transmissions, the process 800 flows to stage 805, wherein the shared antenna is yielded for WiFi usage. The LTE transceiver 303 determines at stage 807 whether the duration that the antenna will not be needed for LTE transmissions is known. If the duration is known, the process 800 flows to stage 809, wherein the LTE transceiver 303 signals the WiFi transceiver 301 to provide the expected duration that the LTE transceiver 303 will not need the shared antenna. Otherwise, the process 800 flows to stage 811, wherein the LTE transceiver 303 signals the WiFi transceiver 301 that the shared antenna will be available for an unknown period.

From either stage 809 or 811, the process 800 flows to stage 813, wherein the LTE transceiver 303 determines whether the LTE main antenna (the shared antenna) is needed by the LTE transceiver 303. If so, the LTE transceiver 303 signals the WiFi transceiver 301 at stage 815 that the shared antenna is unavailable and proceeds back to stage 301.

Figure 10:
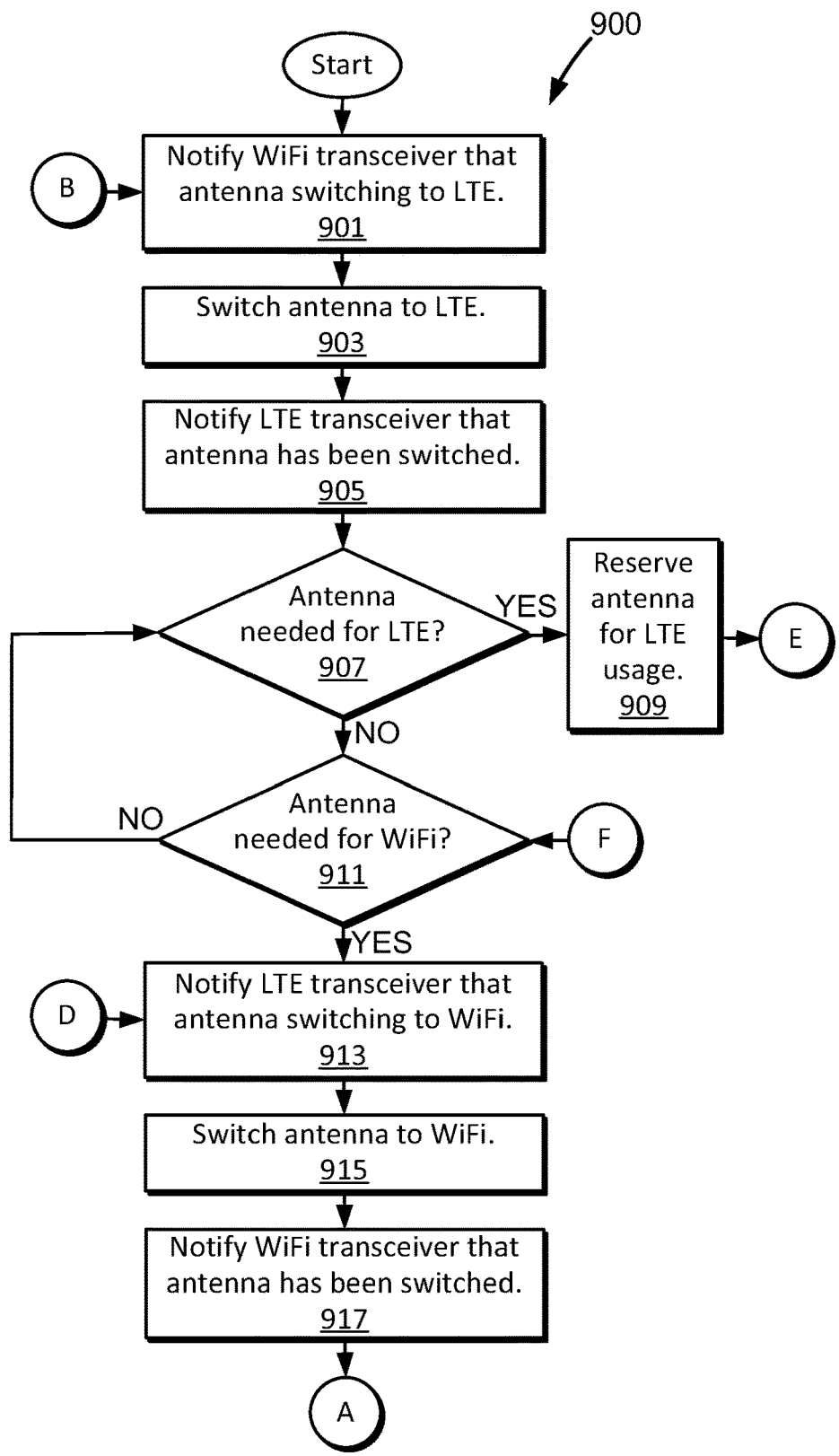
FIG. 10 is a flow chart showing a process for reservation based antenna switching in accordance with an embodiment of the described principles.

Alternatively, the use of the shared antenna may be managed on a reservation basis providing LTE priority. A process 900 in keeping with this embodiment is shown in FIG. 10. This design employs coordination between the LTE transceiver 303 and the MAC of the Wi-Fi transceiver 301 to reserve the antenna. The LTE priority is especially appropriate when the LTE main antenna is used as the shared antenna.

At stage 901 of the process 900, the WiFi transceiver 301 is notified that the antenna is switching to LTE usage, and at stage 903, the antenna is switched. Subsequently at stage 905, the LTE transceiver 303 is notified that the antenna has been switched.

The device determines at stage 907 whether the antenna is needed for LTE communications. If so, the process 900 flows to stage 909, wherein the antenna is reserved for LTE usage. Otherwise, the process 900 flows from stage 907 to stage 911, wherein it is determined whether the antenna is needed for WiFi communications. If not, the process 900 returns to stage 907. If instead it is determined that the antenna is needed for WiFi communications, then the process 900 flows to stage 913.

At stage 913, the LTE transceiver 303 is notified that the antenna is switching to WiFi usage, and at stage 915, the antenna is switched to WiFi usage at stage 917. Subsequently, the WiFi transceiver 301 is notified that the antenna is switching to WiFi usage at stage 919.

Figure 11:
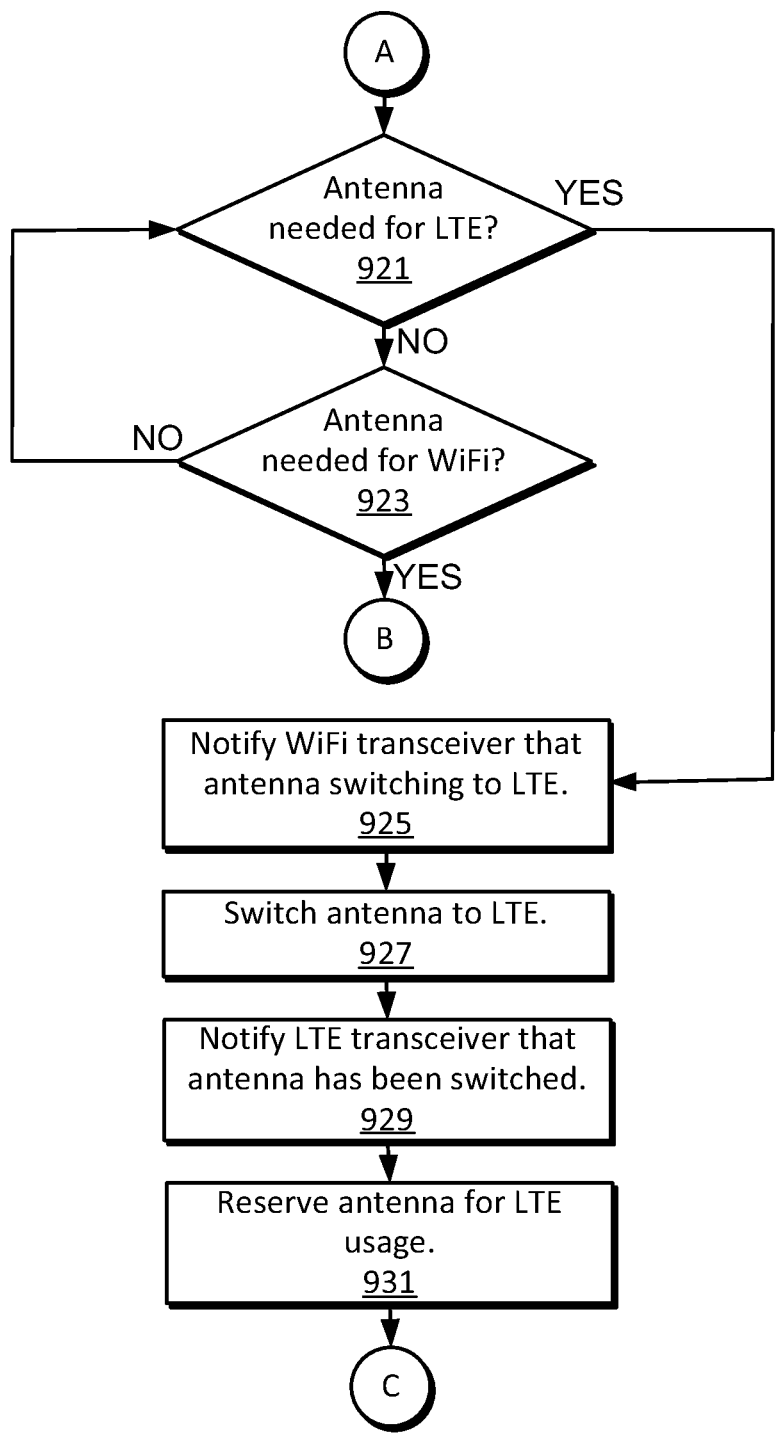
FIG. 11 is a continuation of the flowchart of FIG. 9.

The process 900 continues in FIG. 11 at transition point "A." The device determines at stage 921 whether the antenna is needed for LTE communications. If not, the process 900 flows to stage 923, wherein it is determined whether the antenna is needed for WiFi communications. If not, the process 900 returns to stage 921. If instead it is determined at stage 921 that the antenna is needed for WiFi communications, then the process 900 returns to stage 901.

If it is instead determined at stage 921 that the antenna is needed for LTE communications, the process flows to stage 925, wherein the WiFi transceiver 301 is notified that the antenna is switching to LTE usage. At stage 927, the antenna is switched and at stage 929, the LTE transceiver 303 is notified that the antenna has been switched. The antenna is reserved for LTE usage at stage 931 and the process 900 flows to transition point "C."

Figure 12:
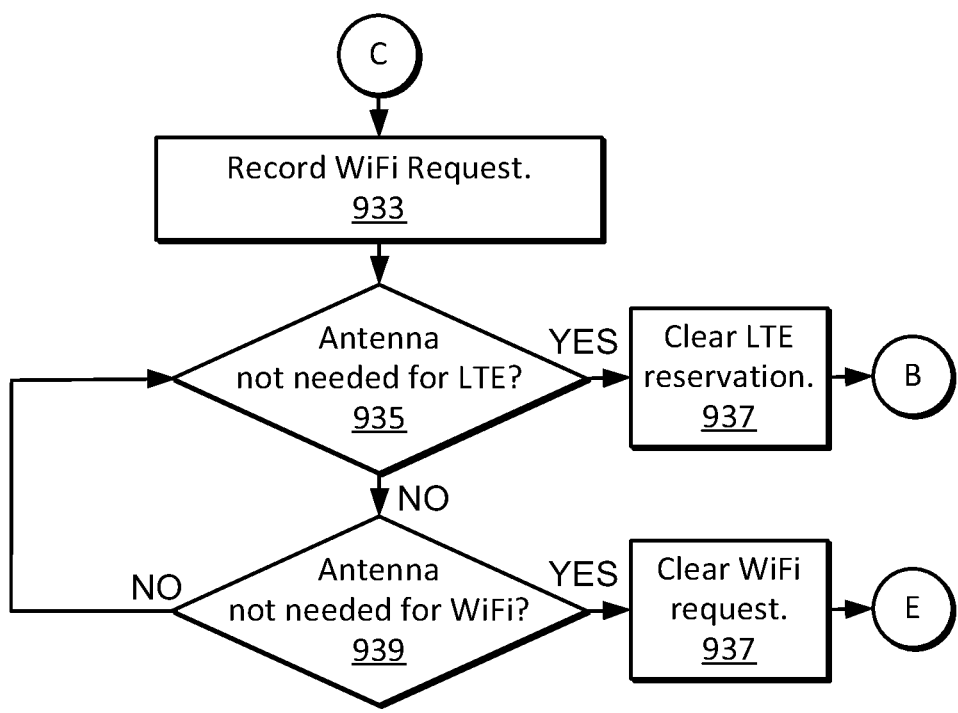
FIG. 12 is a continuation of the flowchart of FIG. 9.
Figure 13:
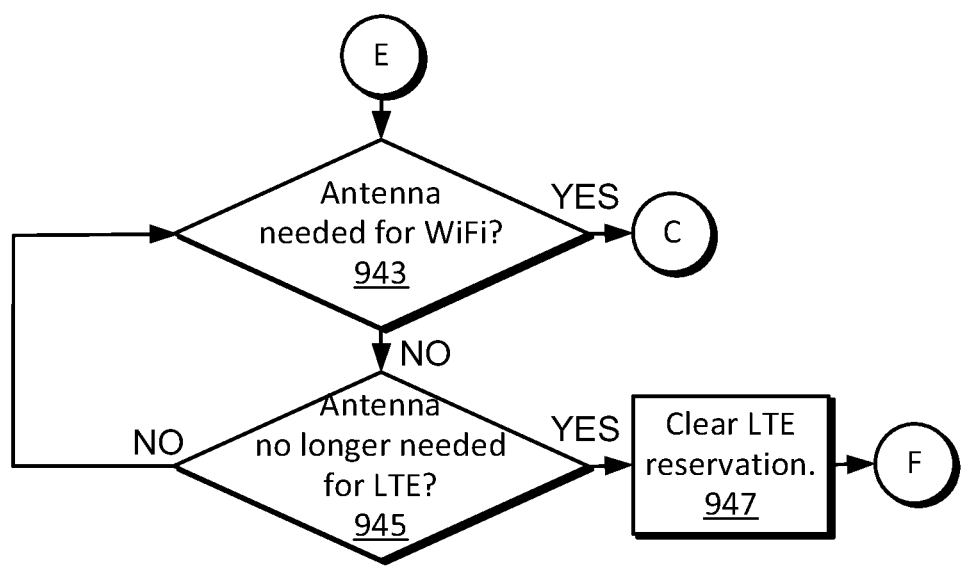
FIG. 13 is a continuation of the flowchart of FIG. 9.

The flow from transition point C is shown in FIG. 12 as process 900 continues. The WiFi request is recorded at stage 933 and it is determined at stage 935 whether the shared antenna is no longer needed for LTE. If the antenna is still needed for LTE, the process 900 flows to stage 937, wherein the LTE reservation is cleared and the process 900 returns to transition point "D." If instead the shared antenna is still needed for LTE, the process 900 flows to stage 939, wherein the device checks whether the antenna is no longer needed for WiFi. If the antenna is not needed for WiFi, the process 900 flows to stage 941, wherein the WiFi request is cleared. From this point, the process 900 flows to transition point "E."

At stage 943 of the process, it is determined whether the shared antenna is needed for WiFi communications, and if so, the process flows to transition point C. Otherwise, the process flows to stage 945, wherein it is determined if the shared antenna is no longer needed for LTE communications. If the shared antenna is no longer needed for LTE communications, the LTE reservation is cleared at stage 947 and the process flows to transition point "F." Otherwise, the process returns to stage 945.

As noted above, the antenna used by one of the two MIMO transceiver inputs may be switched between top and bottom antennas depending on the device environment. For example, if the device senses the user's hand at the bottom of the device, the switchable input of the MIMO transceiver is switched to use the alternative top antenna. Similarly, if the device senses the user's hand at the top of the device, the switchable input of the MIMO transceiver is switched to use the alternative bottom antenna. Although direct sensing via a capacitive sensor and indirect sensing via detection of a degradation in performance were discussed above, any other suitable mechanism or combination of mechanisms may be used in this embodiment.

Figure 14:
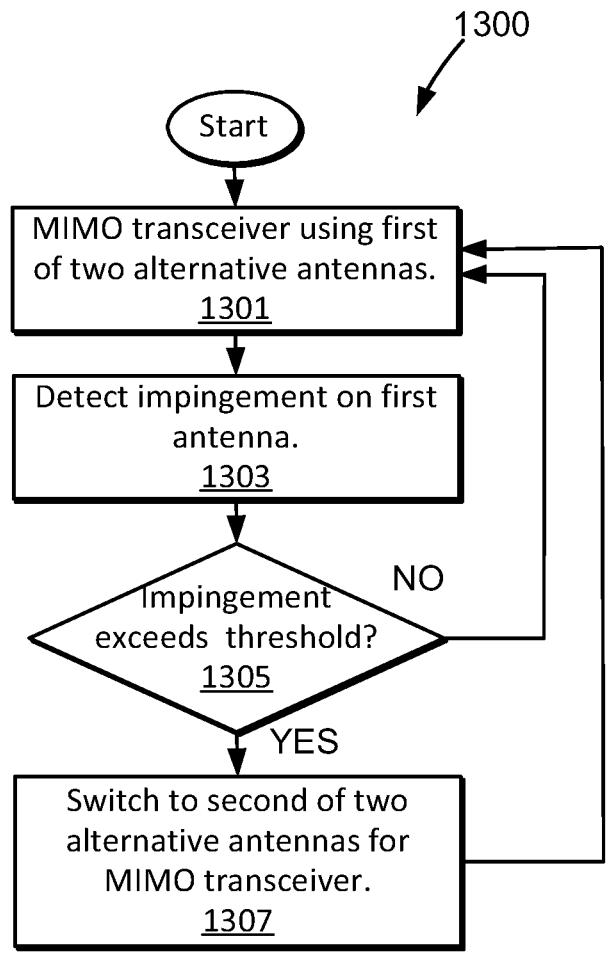
FIG. 14 is a flow chart showing a process 1300 for managing MIMO antenna usage in a variable device environment in accordance with an embodiment of the described principles.

The flow chart of FIG. 14 illustrates a process 1400 for managing MIMO antenna usage in a variable device environment in keeping with this embodiment. At stage 1401 of the process 1400, the device is operating the MIMO transceiver using a top antenna of the device (e.g., ant-1 (211)) and a first of two alternative antennas, e.g., bottom antenna ant-3 (217)). The device detects impingement on the first antenna at stage 1403. When capacitance, signal quality or other continuously variable parameter is used to determine impingement, a division is created between acceptable and unacceptable portions of the parameter range of values.

Thus at stage 1405, it is determined whether the degree of impingement exceeds a predetermined threshold value. If it is determined that the degree of impingement does not exceed the predetermined threshold value, then the process 1400 returns to stage 1401. Otherwise, the process 1400 flows to stage 1407, wherein the device switches from using the first of the two alternative antennas to using a second of the two alternative antennas for the MIMO transceiver, e.g., ant-2 (213). From stage 1407, the process 1400 returns to stage 1401, now using the second antenna rather than the first.

It will be appreciated that various systems and processes for improving geolocation antenna operation have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable electronic communication device comprising:
   a housing;
   a WiFi transceiver;
   an LTE (long term evolution) transceiver; and
   a plurality of antennas, including a first antenna operating for WiFi at 2400 MHz, and a second antenna supporting at least cellular bands between 2300 MHz and 2690 MHz, the second antenna being the sole antenna supporting cellular bands between 2300 MHz and 2690 MHz and also being linkable to the WiFi transceiver to provide MIMO (multiple input, multiple output) operation;
   wherein the housing is metallic and the first antenna and the second antenna are formed as parts of the housing.

2. The portable electronic communication device in accordance with claim 1, wherein at least one of the first antenna or the second antenna is internal to the device housing.

3. The portable electronic communication device in accordance with claim 1, wherein the second antenna is the sole device antenna operating at 2.4 and at 5.0 GHz.

4. The portable electronic communication device in accordance with claim 1, wherein the first antenna provides WiFi connectivity and the second antenna is switchable to provide WiFi connectivity via an RF (radio frequency) switch.

5. The portable electronic communication device in accordance with claim 1, wherein a first antenna provides WiFi connectivity and the second antenna is switchable to provide WiFi connectivity via a multiplexer.

6. The portable electronic communication device in accordance with claim 1, wherein the second antenna is a primary cellular antenna.

7. The portable electronic communication device in accordance with claim 1, wherein the second antenna is a cellular diversity antenna.

8. A method of antenna usage in a portable electronic communication device having a housing, a WiFi transceiver, an LTE (long term evolution) transceiver, and a plurality of antennas, the method comprising:
   operating a first one of the plurality of antennas as a primary WiFi antenna at 2400 MHz;
   operating a second one of the plurality of antennas as a secondary WiFi antenna and also as the sole device antenna that supports cellular bands between 2300 MHz and 2690 MHz; and
   selectively linking the secondary WiFi antenna to the WiFi transceiver for MIMO (multiple input, multiple output) operation;
   wherein the device housing is metallic and the primary WiFi antenna and the secondary WiFi antenna are formed as parts of the housing.

9. The method in accordance with claim 8, wherein at least one of the primary WiFi antenna or the secondary WiFi antenna is internal to the device housing.

10. The method in accordance with claim 8, wherein the secondary WiFi antenna is the sole device antenna operating at 2.4 and at 5.0 GHz.

11. The method in accordance with claim 8, wherein selectively linking the secondary WiFi antenna to the WiFi transceiver comprises using one of an RF (radio frequency) switch and a multiplexer.

12. The method in accordance with claim 8, wherein the secondary WiFi antenna is a primary cellular antenna.

13. The method in accordance with claim 8, wherein the secondary WiFi antenna is a cellular diversity antenna.

* * * * *